(12) United States Patent
Sasagawa et al.

(10) Patent No.: US 7,957,267 B2
(45) Date of Patent: Jun. 7, 2011

(54) FAULT DETECTION DEVICE

(75) Inventors: Yasushi Sasagawa, Kawasaki (JP);
Kenichi Kawarai, Kawasaki (JP);
Masami Doukai, Kawasaki (JP); Kou Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 11/155,658

(22) Filed: Jun. 20, 2005

(65) Prior Publication Data
US 2006/0182036 A1      Aug. 17, 2006

(30) Foreign Application Priority Data

Feb. 16, 2005  (JP) .................................. 2005-039528

(51) Int. Cl.
*H04J 1/16* (2006.01)
(52) U.S. Cl. ........................................ 370/216; 370/242
(58) Field of Classification Search .................. 370/216,
370/218, 224, 241, 242, 244, 245, 252, 241.1,
370/217, 219, 220, 221, 222, 223, 225, 226,
370/227, 228, 243, 250, 255, 256, 257, 434,
370/435, 432, 436, 230, 254, 258, 389; 714/100,
714/43, 717, 715, 716, 47, 48; 709/223,
709/224, 238, 227, 225, 226
See application file for complete search history.

(56) References Cited

U.S. PATENT DOCUMENTS

| | | | |
|---|---|---|---|
| 4,567,595 A * | 1/1986 | Hedlund ........................ | 714/800 |
| 5,790,676 A * | 8/1998 | Ganesan et al. ............... | 380/247 |
| 6,549,882 B1 * | 4/2003 | Chen et al. ..................... | 703/21 |
| 7,142,563 B1 * | 11/2006 | Lin ................................ | 370/469 |
| 7,224,668 B1 * | 5/2007 | Smethurst et al. ............. | 370/229 |
| 7,263,104 B2 * | 8/2007 | Chiba ........................... | 370/434 |
| 7,269,147 B2 * | 9/2007 | Kim et al. ..................... | 370/312 |
| 7,539,489 B1 * | 5/2009 | Alexander .................... | 455/423 |
| 2002/0031099 A1 * | 3/2002 | Cookman et al. ............. | 370/282 |

(Continued)

FOREIGN PATENT DOCUMENTS

JP          9-130358 A          5/1997

(Continued)

OTHER PUBLICATIONS

"Japanese Office Action", Partial English language translation, mailed Sep. 29, 2009 from JP Patent Office for corresponding JP App. No. 2005-039528.

*Primary Examiner* — Aung S Moe
*Assistant Examiner* — Abdullah Riyami
(74) *Attorney, Agent, or Firm* — Fujitsu Patent Center

(57) ABSTRACT

A fault detection device capable of detecting network faults by itself with high accuracy in multi-vendor environments, without the need to interoperate with an associated device according to an identical protocol. A monitoring control packet transmitter generates a fault monitoring control packet and transmits the generated packet to the associated device with which the fault detection device need not interoperate to detect faults according to the same protocol. A transmit packet counter keeps count of the transmitted fault monitoring control packet. A receive packet counter receives a control packet transmitted from the associated device, and keeps count of the received control packet. A fault detector monitors the count of transmitted packets and the count of received packets and, if at least one of the counts remains unchanged for a fixed period of time, judges that a fault has occurred and sends a fault notification to outside.

9 Claims, 13 Drawing Sheets

U.S. PATENT DOCUMENTS

| | | | |
|---|---|---|---|
| 2002/0115457 A1* | 8/2002 | Koscal | 455/466 |
| 2002/0142731 A1* | 10/2002 | Jiang | 455/73 |
| 2003/0069952 A1* | 4/2003 | Tams et al. | 709/223 |
| 2003/0095534 A1* | 5/2003 | Jiang | 370/346 |
| 2004/0052257 A1* | 3/2004 | Abdo et al. | 370/392 |
| 2004/0085894 A1* | 5/2004 | Wang et al. | 370/216 |
| 2004/0147289 A1* | 7/2004 | Paljug et al. | 455/562.1 |
| 2005/0094572 A1* | 5/2005 | Mimura et al. | 370/252 |
| 2005/0108601 A1* | 5/2005 | Driediger et al. | 714/712 |
| 2005/0245222 A1* | 11/2005 | Lehnert et al. | 455/226.1 |
| 2006/0050708 A1* | 3/2006 | Shapiro et al. | 370/394 |
| 2006/0107089 A1* | 5/2006 | Jansz et al. | 714/5 |
| 2006/0133266 A1* | 6/2006 | Kim et al. | 370/228 |
| 2007/0008897 A1* | 1/2007 | Denton et al. | 370/250 |
| 2007/0028147 A1* | 2/2007 | Huang et al. | 714/43 |
| 2007/0201357 A1* | 8/2007 | Smethurst et al. | 370/229 |
| 2009/0225675 A1* | 9/2009 | Baum et al. | 370/252 |

FOREIGN PATENT DOCUMENTS

| | | |
|---|---|---|
| JP | 2003-304264 A | 10/2003 |
| JP | 2005-33485 A | 2/2005 |

\* cited by examiner

FAULT DETECTION DEVICE

CROSS-REFERENCE TO RELATED APPLICATIONS

This application is based upon and claims the benefits of priority from the prior Japanese Patent Application No. 2005-039528, filed on Feb. 16, 2005, the entire contents of which are incorporated herein by reference.

BACKGROUND OF THE INVENTION

1. Field of the Invention

The present invention relates to fault detection devices, and more particularly, to a fault detection device for detecting faults on a network.

2. Description of the Related Art

In recent years, telecommunications carriers provide wide area Ethernet ("Ethernet" is a registered trademark) as one of carrier services using LANs (Local Area Networks) and the service is more and more diffusing. Wide area Ethernet is a service whereby a plurality of Ethernet LAN environments are interconnected by Layer 2 switches to be integrated into a single network.

Wide area Ethernet does not require an expensive router (Layer 3 switch) but uses an inexpensive switching hub (Layer 2 switch), and accordingly, the costs involved in the configuration and operation management of networks can be cut down. It is possible, for example, to connect corporate LANs so as to cover the entire area of a city.

If, in such carrier networks, a network fault occurs and recovery therefrom is delayed, serious damage is caused. Thus, carrier networks adopt a redundant configuration at various levels such as duplication of various packages in devices, duplication of devices per se, duplication of links, and duplication of end-to-end paths. When a fault is detected, switchover to a redundant system is promptly effected, thereby enhancing fault tolerance.

Redundant configuration is, however, meaningless unless a device itself can quickly detect faults with accuracy. Where a silent fault (fault which does not trigger off automatic switchover to the redundant system or notification of an alarm to the operator and thus it is difficult to distinguish anomaly in operation) has occurred, the fault period lasts long, and in the case of an Ethernet network, looping is caused, possibly entailing congestion of frames.

FIGS. 11 and 12 illustrate a network fault caused by looping. A network 50 is constituted by nodes 51 to 54 connected together in the form of a ring, and the nodes 51 and 54 are connected to each other (in the figure, thin solid lines indicate physical links).

In Ethernet networks, paths are configured to have a tree structure so that no looped path may exist. This is because, if a looped path exists in the network, congestion of frames called broadcast storm is caused when a frame is broadcasted.

Specifically, when a broadcast frame is sent out from a certain node, all ports of each node except the receive port are flooded with the broadcast frame. Thus, if a loop exists in the network, broadcast frames endlessly circulate through the same looped path.

If this occurs, the broadcast frames instantly fill up the band, making normal communications unavailable. For example, the network 50 shown in FIG. 11 has a loop R, and thus the broadcast frames endlessly circulate through the loop R, as via the node 51→node 52→node 53→node 54→node 51→ . . . , causing congestion.

When configuring an Ethernet network, therefore, it is necessary to logically block loops of the Layer 2 network. For example, links L1 and L2 are logically blocked as shown in FIG. 12, then all loops are eliminated, forming a tree structure T (in the figure, indicated by the thick solid line).

To form such a tree (called spanning tree), control information called BPDU (Bridge Protocol Data Unit) is exchanged among the nodes according to STP (Spanning Tree Protocol) control, for example, to dynamically alter traffic paths (in the case of static operation, the individual nodes are previously set so as to form tree paths). This prevents the situation where frames endlessly circulate through a loop, even if the network has a physical loop.

However, even with the spanning tree formed as shown in FIG. 12, if the fault detection function fails to effectively work due to a silent fault occurring in the network 50, consistency of routing information among the nodes is lost, destroying the tree structure and possibly creating a loop. To cope with a silent fault, therefore, it is important not only to employ redundant configuration but to detect faults with high accuracy.

As conventional techniques for Ethernet fault detection, a technique of conducting a loopback test by means of a device within a LAN has been proposed (e.g., Japanese Unexamined Patent Publication No. 2003-304264 (paragraph nos. [0020] to [0027], FIG. 1)).

In cases where a silent fault as mentioned above has occurred, switchover from the operational system to the redundant system is not effected until customers' complaints about the service are received. Thus, since the service is disrupted for a long period of time, vendors have been making attempts to create their own vendor-specific protocols for detecting network faults.

FIG. 13 illustrates an exemplary procedure for detecting ordinary network faults by means of a vendor-specific protocol. Nodes A and B are connected to each other by links L3 and L4.

[S21] The node A transmits a frame Fa to the node B through the link L3. The frame Fa includes a local node identification (ID) field and a remote node identification field. When transmitting the frame Fa, the node A inserts "A", which is indicative of itself, into the local node identification field and inserts "B", which is described in the local node identification field of a frame Fb received via the link L4, into the remote node identification field as redirected information.

[S22] The node B transmits a frame Fb to the node A through the link L4. The frame Fb also includes a local node identification field and a remote node identification field. When transmitting the frame Fb, the node B inserts "B", which is indicative of itself, into the local node identification field and inserts "A", which is described in the local node identification field of the frame Fa received via the link L3, into the remote node identification field as redirected information.

[S23] On receiving the frame Fb, the node A stores, in its memory, the information "B" described in the local node identification field of the frame Fb (i.e., the information indicating that the remote node is the node B). It is assumed here that the information in the memory ages (the information in the memory is cleared and updated) in one minute and that the frame Fb is transmitted at intervals of 20 seconds.

[S24] On receiving the frame Fa, the node B stores, in its memory, the information "A" described in the local node identification field of the frame Fa (i.e., the information indicating that the remote node is the node A). Also in this case, the information in the memory ages in one minute and the frame Fa is transmitted at intervals of 20 seconds.

[S25] If the frame Fb fails to reach the node A three times consecutively, then the memory is cleared. In this case, the node A generates a frame Fa-1 having "0" inserted in the remote node identification field and transmits the generated frame to the node B. Also, since the frame Fb did not arrive three times consecutively, the node A judges that a fault has occurred in the link L4 (or the associated node B).

[S26] The node B receives the frame Fa-1 and recognizes that "0" has been inserted in the remote node identification field. Namely, the node B recognizes that the node identification name (B) of its own is not communicated to the node A and that the frame Fb transmitted therefrom is not normally received by the node A, and thus concludes that a fault has occurred in the link L4 (or the associated node A).

In this manner, each transmitting/receiving node can detect a fault by detecting the "non-reception of the control frame from the associated device over a fixed period of time" and the "discrepancy between the information transmitted from the local device and the redirected information in the control frame received from the associated device."

However, existing network fault detection techniques based on vendor-specific protocols are subject to the precondition that the local device is aware of what the associated device monitors, as in the above example, and have the problem that the techniques can be applied only to the links connected by the devices of the same vendor's make within the network.

Thus, the existing techniques are not convenient enough in view of the fact that more and more carrier networks are configured in multi-vendor environments, and at present, standardization of network fault detection protocols is yet to be developed.

Accordingly, there has been a strong demand for highly fault-tolerant techniques which permit network faults to be detected in multi-vendor environments, without the need for interoperation between a local device and its associated device according to an identical protocol and without making the associated device aware of fault monitoring.

SUMMARY OF THE INVENTION

The present invention was created in view of the above circumstances, and an object thereof is to provide a fault detection device capable of high-accuracy detection of network faults by itself, without the need to interoperate with its associated device according to an identical protocol.

To achieve the object, there is provided a fault detection device for detecting faults on a network. The fault detection device comprises a monitoring control packet transmitter for generating a fault monitoring control packet and transmitting the generated fault monitoring control packet to an associated device with which the fault detection device need not interoperate to detect faults according to an identical protocol, a transmit packet counter for keeping count of the transmitted fault monitoring control packet, a receive packet counter for receiving a control packet transmitted from the associated device and keeping count of the received control packet, and a fault detector for monitoring the count of transmitted packets and the count of received packets and, if at least one of the counts remains unchanged for a fixed period of time, judging that a fault has occurred and sending a fault notification to outside.

And communication devices such as Layer 2 switches can have the function of the fault detection device.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
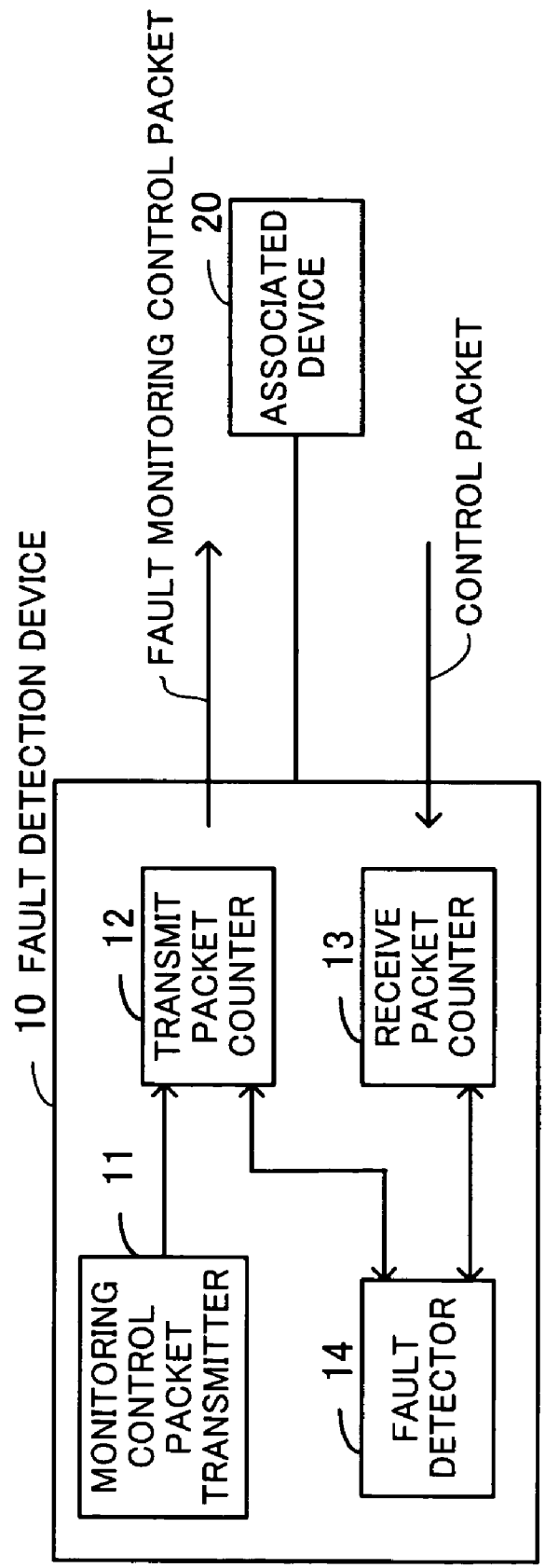
FIG. 1 illustrates the principle of a fault detection device.

Preferred embodiments of the present invention will be described below with reference to the accompanying drawings. FIG. 1 illustrates the principle of a fault detection device. The fault detection device 10 comprises a monitoring control packet transmitter 11, a transmit packet counter 12, a receive packet counter 13 and a fault detector 14, and detects faults on a network. The function of the fault detection device 10 may be incorporated, for example, in a Layer 2 switch on a wide area Ethernet.

The monitoring control packet transmitter 11 generates a fault monitoring control packet and transmits the generated packet to an associated device 20 with which the fault detection device 10 need not interoperate to detect faults according to an identical protocol (i.e., to a device of a vendor's make different from that of the fault detection device). The transmit packet counter 12 keeps count of the transmitted fault monitoring control packet.

The receive packet counter 13 receives a control packet transmitted from the associated device 20 and keeps count of the received control packet. The fault detector 14 monitors the count of transmitted packets and the count of received packets and, if at least one of the counts remains unchanged for a fixed period of time, judges that a fault has occurred and sends a fault notification to outside.

Figure 2:
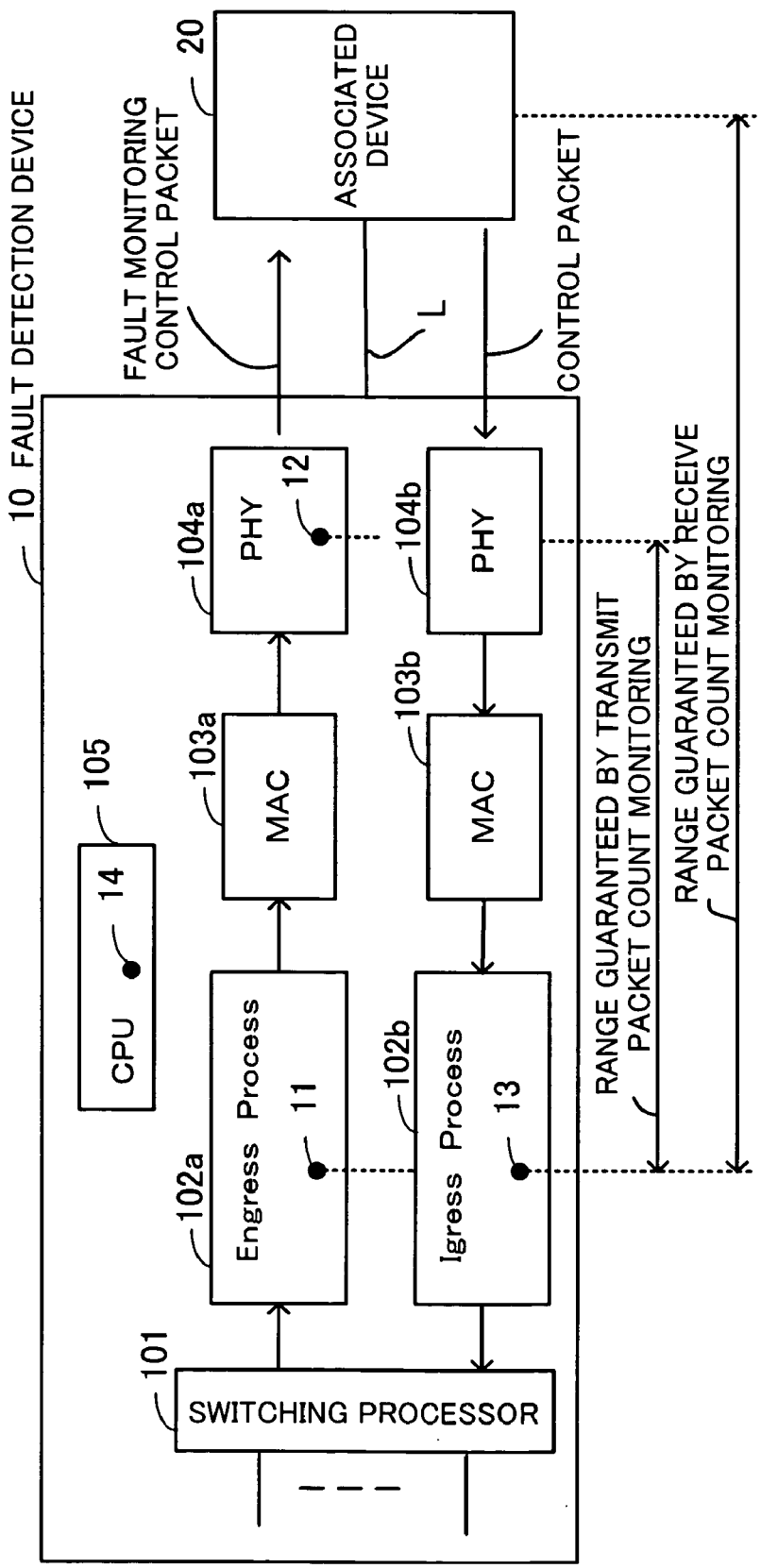
FIG. 2 is a block diagram of the fault detection device.

The following describes the manner of how the monitoring control packet transmitter 11, the transmit packet counter 12 and the receive packet counter 13 are arranged in the fault detection device 10. FIG. 2 is a block diagram of the fault detection device 10. The fault detection device 10 comprises a switching processor 101, an output packet processor (Egress Process) 102a, an input packet processor (Ingress Process) 102b, MAC (Media Access Control) processors 103a and 103b, link interfaces 104a and 104b, and a CPU 105.

The output packet processor 102a takes care of the input of packets switched by the switching processor 101, and the MAC processor 103a takes care of a MAC layer termination process. The link interface 104a performs a transmission interfacing process at the physical layer and transmits the packets to the associated device 20 through a link L.

The link interface 104b performs a reception interfacing process at the physical layer on packets received from the associated device 20 via the link L, and the MAC processor 103b performs a MAC layer termination process. The input packet processor 102b takes care of a packet output process and sends the packets to the switching processor 101. The CPU 105 controls the overall operation of the individual elements.

The function of the monitoring control packet transmitter 11 is incorporated in the output packet processor 102a, and the function of the transmit packet counter 12 is incorporated in the link interface 104a. The output packet processor 102a sends out a fault monitoring control packet at fixed intervals, and the link interface 104a keeps count of the transmitted fault monitoring control packet.

The CPU 105, which functions as the fault detector 14, monitors the count of transmitted packets counted by the transmit packet counter 12 and, if the count remains unchanged for a fixed period of time, judges that a fault has occurred (the fault monitoring control packet is sent out from the monitoring control packet transmitter 11 at fixed intervals, and accordingly, if the count fails to increase for the fixed period of time, then it means that a fault has occurred).

In this case, the path from the output packet processor 102a up to the link interface 104a via the MAC processor 103a corresponds to a fault detection guarantee range (with this transmitting-side fault detection, it is not possible to confirm that the packets reach the associated device 20 without fail, but insofar as the link L is established and the path up to at least the link interface 104a is normal, there is very little probability that the traffic fails to reach the associated device 20, and thus the fault detection can cover a wide range).

The function of the receive packet counter 13 is incorporated in the input packet processor 102b, and the input packet processor 102b keeps count of the packet received from the associated device 20.

The CPU 105, which functions as the fault detector 14, monitors the count of received packets counted by the receive packet counter 13 and, if the count remains unchanged for a fixed period of time, judges that a fault has occurred (a control packet is transmitted from the associated device 20 at fixed intervals, and accordingly, if the count fails to increase for the fixed period of time, then it means that a fault has occurred). In this case, the path from the associated device 20 up to the input packet processor 102b via the link interface 104b and the MAC processor 103b corresponds to a fault detection guarantee range.

Thus, in the case of transmitting fault monitoring control packets for the purpose of fault detection, the monitoring control packet transmitter 11 is arranged at a higher-layer process side (inside) of the device, and the transmit packet counter 12 is arranged at a physical-layer process side (outside) of the device. Also, in the case of detecting faults by means of the control packets transmitted from the associated device 20, the receive packet counter 13 is arranged at a higher-layer process side of the device. By arranging the elements in this manner, it is possible to set the fault detection guarantee ranges as wide as possible, as stated above.

Figure 3:
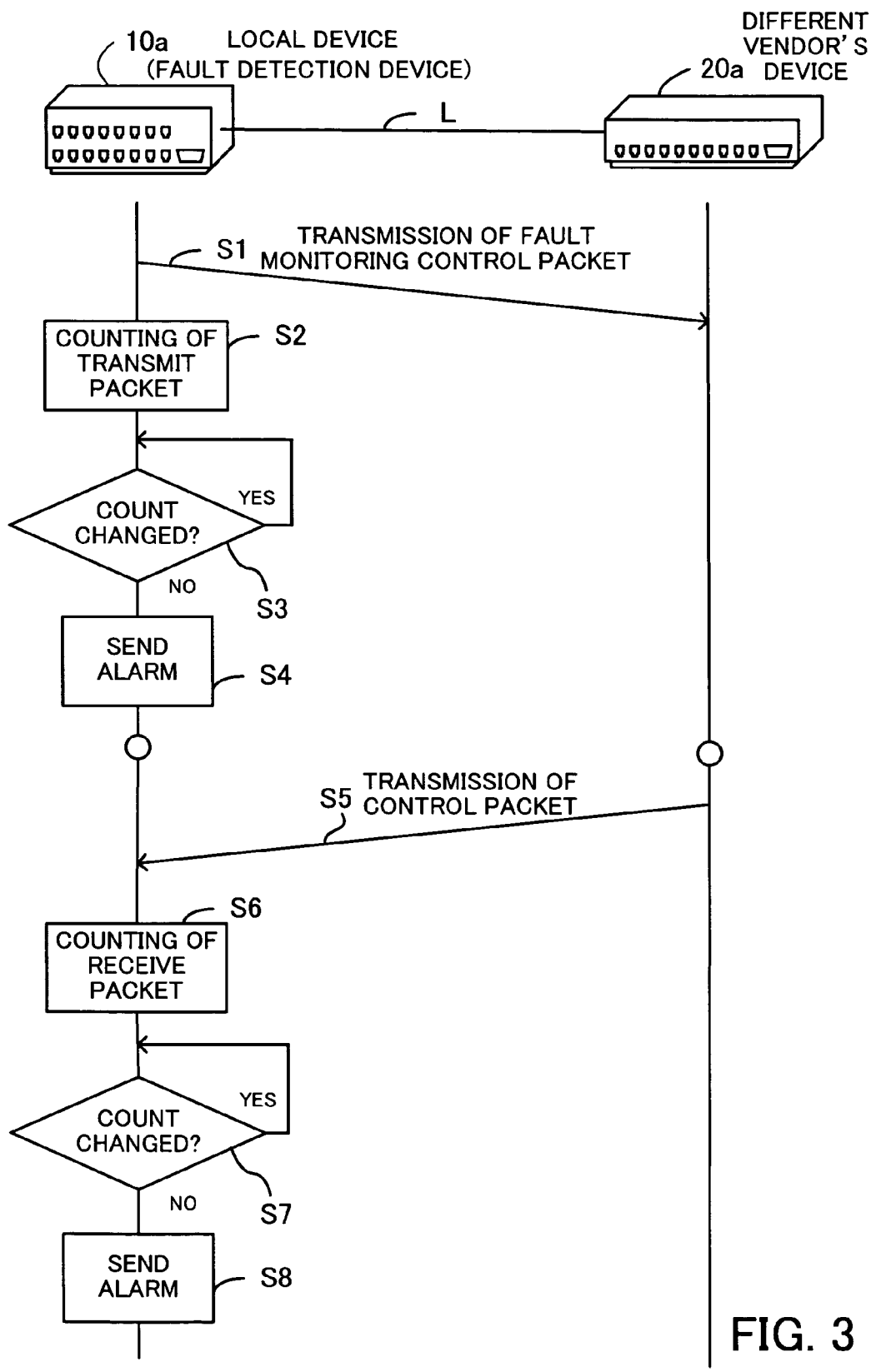
FIG. 3 is a sequence diagram illustrating how fault detection is performed when devices are connected by a single link.

Fault detection performed in the case where devices are connected by a single link will be now described with reference to the sequence diagram of FIG. 3. A device 10a, which is a local device having the function of the fault detection device 10, and a device 20a, which is a product of a different vendor and corresponds to the associated device 20, are connected by a single link L.

[S1] The monitoring control packet transmitter 11 of the device 10a transmits the fault monitoring control packet, which is a unique packet for fault monitoring, to the device 20a at fixed intervals. The fault monitoring control packet has no control content set in the payload thereof and is discarded by the device 20a upon reception.

[S2] The transmit packet counter 12 of the device 10a keeps count of the transmitted fault monitoring control packet.

[S3] The fault detector 14 of the device 10a monitors the count of transmitted packets. If the count fails to change (if the count is not incremented), the process proceeds to Step S4; if the count changes, the monitoring is continued.

[S4] The fault detector 14 judges that a fault has occurred in the device 10a, and sends an alarm to outside.

[S5] The device 20a transmits the control packet. The control packet may be any control packet that is transmitted from the device 20a at fixed intervals (any control packet may be used since the packet is used for the purpose of counting only).

[S6] The receive packet counter 13 of the device 10a receives the control packet and keeps count of the received control packet.

[S7] The fault detector 14 of the device 10a monitors the count of received packets. If the count fails to change, the process proceeds to Step S8; if the count changes, the monitoring is continued.

[S8] The fault detector 14 judges that a fault has occurred in the path from the device 20a to the device 10a, and sends an alarm to outside.

The fault monitoring control packet and the control packet transmitted in Steps S1 and S5, respectively, are each a packet which is independent of user traffic and which is sent out onto the link L constantly at fixed intervals.

Namely, if fault is detected based on the count of packets related with the user traffic, the count may fail to change in the nighttime etc. because of decrease in the user traffic, creating a possibility that fault is detected in error even though the communication state is normal.

To avoid this, the device 10a transmits a unique fault monitoring control packet having no relation with the user traffic and receives from the device 20a a control packet having no relation with the user traffic. This makes it possible to carry out error-free fault detection even in cases where there is no user traffic.

In Steps S4 and S8, an alarm is sent out to notify the operator of the need for maintenance, and after sending out the alarm, the fault detection device 10 disables the corresponding port (the associated device 20 then detects disconnection of the link). The disabled port is recovered manually or is automatically recovered at regular intervals. Further, when a fault is detected, switchover to the redundant link/device may be effected, so that the operational system may be switched to the redundant system.

As stated above, the fault detection device 10 measures the number of transmitted packets and the number of received packets as statistics information, and detects faults based on the collected statistics information. This configuration makes it possible to carry out fault detection without regard to the content monitored by the associated device 20. Namely, in multi-vendor environments, the local device need not interoperate with its associated device according to an identical protocol and yet can efficiently detect network faults without making the associated device 20 aware of fault monitoring and without the need to add a redundant port. Accordingly, unlike conventional techniques which permit only faults of links between devices of an identical vendor's make to be detected, network faults occurring between different vendors' devices can be detected with high accuracy, thus improving fault tolerance in multi-vendor environments.

The following describes the manner of how fault detection is performed when the devices 10a and 20a from different vendors are connected by a link aggregation (hereinafter referred to as LA). LA denotes a connection scheme in which multiple links are treated as a single virtual link and which is defined by IEEE 802.3ad.

Figure 4:
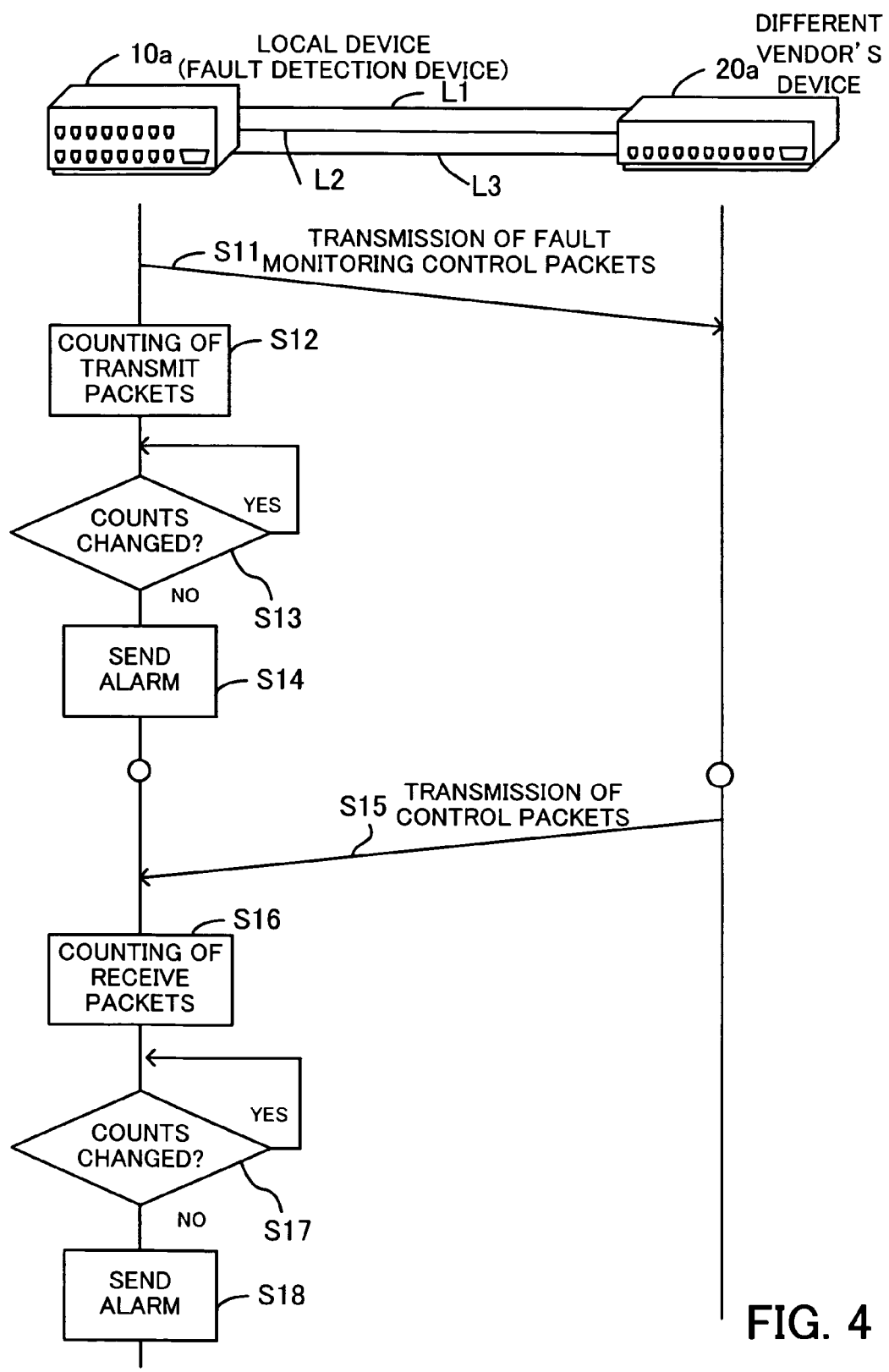
FIG. 4 is a sequence diagram illustrating how fault detection is performed when devices are connected by an LA.

FIG. 4 is a sequence diagram illustrating how fault detection is performed when the devices are connected by an LA. As illustrated, the devices 10a and 20a are connected by three links L1 to L3 which are used as a single virtual link.

[S11] The monitoring control packet transmitter 11 of the device 10a transmits the fault monitoring control packet, which is a unique packet for fault monitoring, to the device 20a via the links L1 to L3 at fixed intervals.

[S12] The transmit packet counter 12 of the device 10a keeps count of the fault monitoring control packet transmitted via each of the links L1 to L3.

[S13] The fault detector 14 of the device 10a monitors the counts of packets transmitted via the respective links L1 to L3. If the counts fail to change, the process proceeds to Step S14; if the counts change, the monitoring is continued.

[S14] The fault detector 14 judges that a fault has occurred in the device 10a, and sends an alarm to outside.

[S15] The device 20a transmits the control packet via the links L1 to L3.

[S16] The receive packet counter 13 of the device 10a receives the control packets via the respective links L1 to L3 and keeps count of the respective control packets.

[S17] The fault detector 14 of the device 10a monitors the counts of packets received via the respective links L1 to L3. If the counts fail to change, the process proceeds to Step S18; if the counts change, the monitoring is continued.

[S18] The fault detector 14 judges that a fault has occurred in the path from the device 20a to the device 10a, and sends an alarm to outside.

Figure 5:
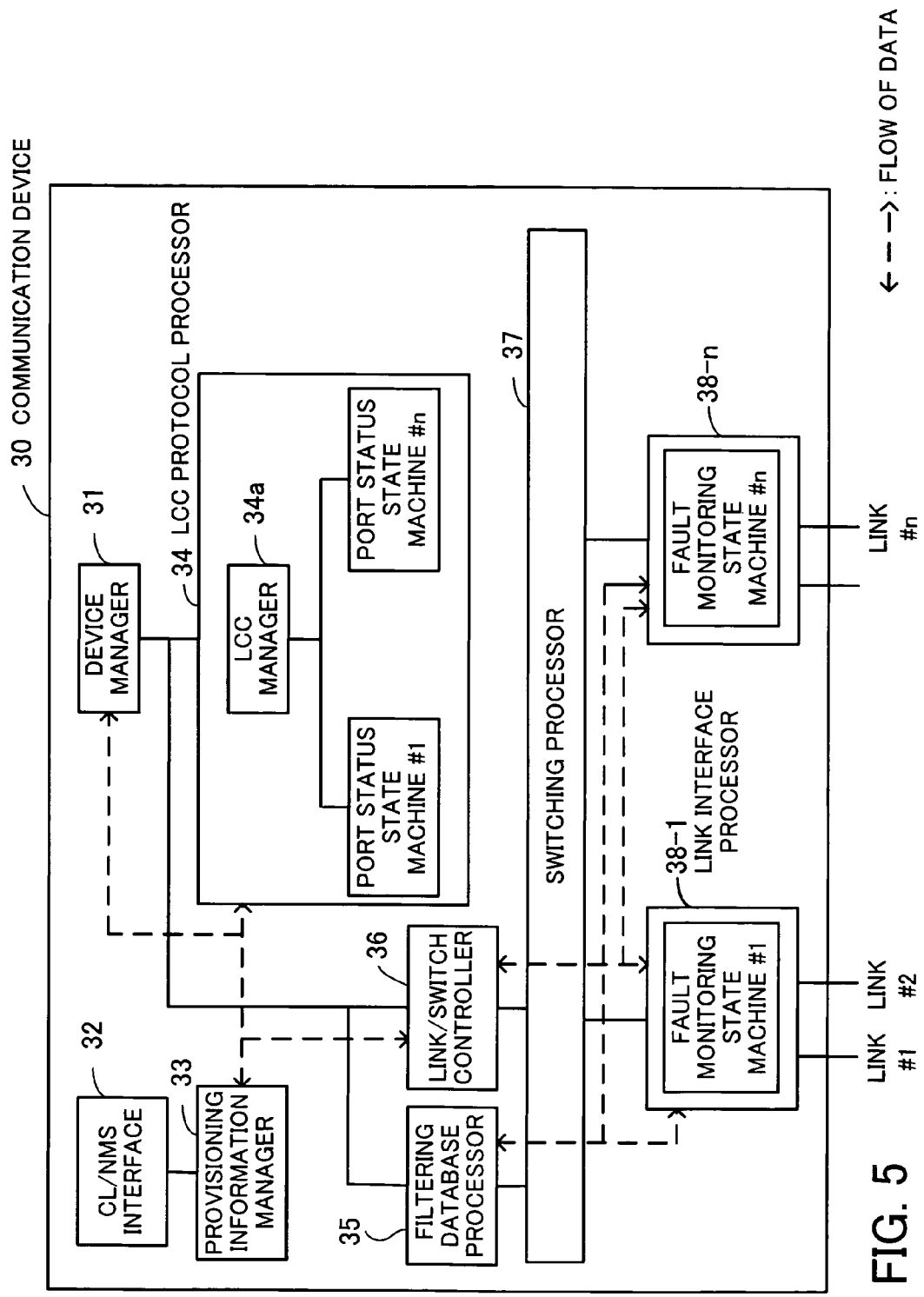
FIG. 5 shows the configuration of a communication device having the function of the fault detection device.

The following describes the configuration and operation of a device embodying the fault detection device 10 of the present invention. FIG. 5 shows the configuration of a communication device having the function of the fault detection device 10. The communication device 30 comprises a device manager 31, a CL (Command Line)/NMS (Network Management System) interface 32, an LCC (Link Connectivity Check) protocol processor 34, a filtering database processor 35, a link/switch controller 36, a switching processor 37, and link interface processors 38-1 to 38-n.

The functions of the monitoring control packet transmitter 11, transmit packet counter 12 and receive packet counter 13 are incorporated in each of the link interface processors 38-1 to 38-n, and the function of the fault detector 14 is incorporated in the LCC protocol processor 34.

The device manager 31 manages the entire device. Specifically, the device manager cooperates with a provisioning information manager 33 to instruct operating conditions to the switching processor 37, the link interface processors 38-1 to 38-n and the LCC protocol processor 34 in accordance with provisioning information of the device.

Also, the device manager 31 acquires information about operating state, fault occurrence, fault recovery, etc. from the switching processor 37, the link interface processors 38-1 to 38-n, and the LCC protocol processor 34, and takes necessary actions. In connection with the fault detection control, the device manager 31 has the following extended functions (A1) to (A4), for example:

(A1) The device manager reads out setting information on the parameter "adminstatus" of individual ports in cooperation with the provisioning information manager 33 and, in accordance with the read information, instructs operating conditions to the LCC protocol processor 34.

(A2) When notified of fault detection from the LCC protocol processor 34, the device manager notifies the operator that a fault has been detected.

(A3) When notified of fault detection from the LCC protocol processor 34, the device manager recognizes that a fault has been detected and, if necessary, instructs the filtering database processor 35 to flash the filtering database.

(A4) When notified of fault detection from the LCC protocol processor 34, the device manager recognizes that a fault has been detected and, if necessary, instructs, via the link/switch controller 36, the link interface processor 38-1, . . . , 38-n to make a transition to "Disable" state.

The CL/NMS interface 32 administers the interfacing with CL (Command Line)/NMS (Network Management System) and, in this instance, cooperates with the provisioning information manager 33 to set and display management information.

Following the instructions from the CL/NMS interface 32, the provisioning information manager 33 sets/displays provisioning information and also permits the individual functional blocks to look up the provisioning information.

The LCC protocol processor 34 is a principal part responsible for LCC operation and, when a fault is detected, notifies the device manager 31 of the fault detection in accordance with the operating conditions instructed from the device manager 31. In connection with the fault detection control, the LCC protocol processor 34 has the following extended functions (B1) to (B5), for example:

(B1) In accordance with the instructions from the device manager 31, the LCC protocol processor enables/disables the fault monitoring function/control packet transmission function of the individual ports and instructs port status state machines #1 to #n to operate accordingly. If necessary, the LCC protocol processor instructs the link interface processors 38-1 to 38-n to start/stop the fault monitoring.

(B2) While the control packet transmission function is enabled, the LCC protocol processor instructs as needed the link interface processors 38-1 to 38-n to transmit the fault monitoring control packet at the intervals specified by the device manager 31.

(B3) While the fault monitoring function is enabled, the LCC protocol processor receives a fault detection notification/recovery notification from the link interface processor 38-1, . . . , 38-n, and notifies the port status state machine #1, . . . , #n of the occurrence of the event.

(B4) The LCC protocol processor locates a faulty port based on the operations of the port status state machines #1 to #n and notifies the device manager 31 of the faulty port.

(B5) In accordance with the instructions from the device manager 31, the LCC protocol processor instructs, via the link/switch controller 36, the link interface processor 38-1, . . . , 38-n to make a transition to "Disable" state.

In cooperation with the provisioning information manager 33, the device manager 31 and the link interface processors 38-1 to 38-n, the filtering database processor 35 manages the original of MAC filtering database, provides the individual link interface processors with necessary MAC filtering database, and also instructs the switching processor 37 to perform necessary switching.

In accordance with the instructions from the device manager 31, the link/switch controller 36 notifies the switching processor 37/link interface processors 38-1 to 38-n of operating conditions, and transfers information about operating state/fault occurrence/fault recovery etc. from the switching processor 37/link interface processors 38-1 to 38-n to the device manager 31.

Following the instructions from the link/switch controller 36, the switching processor 37 performs switching of the individual link interface processors with respect to necessary functional blocks in the local device 30.

In accordance with the instructions from the link/switch controller 36, the link interface processors 38-1 to 38-n transmit/receive packets while looking up the MAC filtering database. In connection with the fault detection control, the link interface processors 38-1 to 38-n each have the following extended functions (C1) and (C2), for example:

(C1) In accordance with the instructions from the LCC protocol processor 34, the link interface processors instruct respective fault monitoring state machines #1 to #n to start/stop the fault monitoring.

(C2) The link interface processors cause the respective fault monitoring state machines #1 to #n to periodically monitor changes in the counts of received and transmitted packets, as statistics information (packet counts), and notify the LCC protocol processor 34 of fault detection/recovery detection.

The following describes how settings are made with respect to the fault detection operation of the communication device 30.

(1) Statistics Information Monitored for Fault Detection (1a) Receive Packet Count: Change in the sum of unicast and non-unicast packets received by a MAC chip is monitored. Those counters which are not cleared by CLI are monitored.

(1b) Transmit Packet Count: Change in the sum of unicast and non-unicast packets transmitted from the MAC chip is monitored. Those counters which are not cleared by CLI are monitored.

(2) With respect to the operation of individual physical ports, the following are specified.

(2a) The port operation is specified such that the control packet with a specific MAC DA (multicast address/unicast address of the associated device) and "Ethertype" is transmitted at the specified intervals.

(2b) The port operation mode at the time of fault detection is specified.

(TRAP notification only (on detection of a fault, an alarm is sent out to notify the need for maintenance)/TRAP notification+shutdown (on detection of a fault, an alarm is sent out to notify the need for maintenance and also the corresponding port is disabled)/TRAP notification+shutdown+automatic recovery (on detection of a fault, an alarm is sent out to notify the need for maintenance, the corresponding port is disabled, and automatic recovery is tried at regular intervals.)

(2c) A fault detection guard count is specified.

Fault is judged to have occurred if the fault continues for a time period corresponding to: fault detection timer value× fault detection guard count. In the fault detection timer, a fixed time of 8 seconds is set (If the receive packet count/transmit packet count fails to change during this timer period, it is judged that a fault has occurred).

(3) Transmission of the fault monitoring control packet is started at the following timing:

When "the physical port of the corresponding port makes a transition to 'UP' state" while "the LCC function is enabled for the corresponding port" and the corresponding port can transmit/receive packets.

(4) Monitoring of change in the transmit packet count/receive packet count is started at the following timings (taking account of "LINK UP/DOWN" of the physical port):

(4a) When "the corresponding port makes a transition to 'LINK UP'" while "the LCC function is enabled for the corresponding port".

(4b) When "LINK UP" of the corresponding port is detected after "LINK DOWN" of the port is detected in a "Monitoring Normal State".

(4c) In the TRAP notification mode, when the corresponding port recovers automatically following fault detection.

(4d) In the TRAP notification mode, when "LINK UP" of the corresponding port is detected after "LINK DOWN" of the port is detected in a recovery wait state following fault detection.

(4e) In the TRAP notification+shutdown mode, when "LINK UP" of the corresponding port meets with success as a result of a recovery instruction from the operator after "shutdown" is executed following fault detection.

When "LINK UP" of the corresponding port is detected in the above cases, the monitoring is started under the additional condition that the corresponding port is capable of transmitting/receiving packets.

(5) Monitoring of change in the transmit packet count/receive packet count is stopped at the following timings (taking account of "LINK UP/DOWN" of the physical port):

(5a) When the LCC function of the corresponding port is disabled.

(5b) When "LINK DOWN" of the corresponding port occurs.

(5c) During operation of the corresponding mode in the TRAP notification+shutdown mode or TRAP notification+shutdown+automatic recovery mode, when "shutdown" is executed following fault detection.

(6) Discrimination Between "shutdown" and Ordinary "shutdown" and Recovery Method.

(6a) A new port status (LccOperStatus) recognizable by the function of the present invention is provided. When "ifOperStatus" indicates "down" state and "LccOperStatus" indicates "failure", it is judged that "shutdown" is under execution by the function of the present invention.

(6b) A "noshutdown" command is used for the recovery from the above state.

(6c) The detected fault itself is not handled as an alarm for the system. Namely, the detection of a fault by the function of the present invention triggers off TRAP notification only.

(7) The following describes the fault monitoring scheme.

(7a) The fault monitoring is triggered off when any of the conditions explained in (4) above is fulfilled.

(7b) Change in the "receive packet count" and "transmit packet count", defined in (1) above, is monitored using the fault detection timer value, defined in (2) above, as a cycle.

(7c) The "receive packet count"/"transmit packet count" acquired in the preceding cycle is compared with the "receive packet count"/"transmit packet count" acquired in the present cycle, and if either of the receive and transmit packet counts of the preceding and present cycles coincide, it is judged that a fault has occurred. If the fault is continuously detected a number of times corresponding to the specified guard count, a fault detection notification is sent out together with additional information specifying the corresponding counter name and the corresponding port ID.

(7d) While a fault is being detected, recovery from the fault is monitored following the same procedure as stated above. Specifically, the "receive packet count"/"transmit packet count" acquired in the preceding cycle is compared with the "receive packet count"/"transmit packet count" acquired in the present cycle, and if both the receive and transmit packet counts show change, it is judged that the corresponding port has recovered. In this case, a recovery notification is sent out together with additional information specifying the corresponding port ID.

(7e) The fault monitoring is stopped when any of the conditions explained in (5) above is fulfilled.

Figure 6:
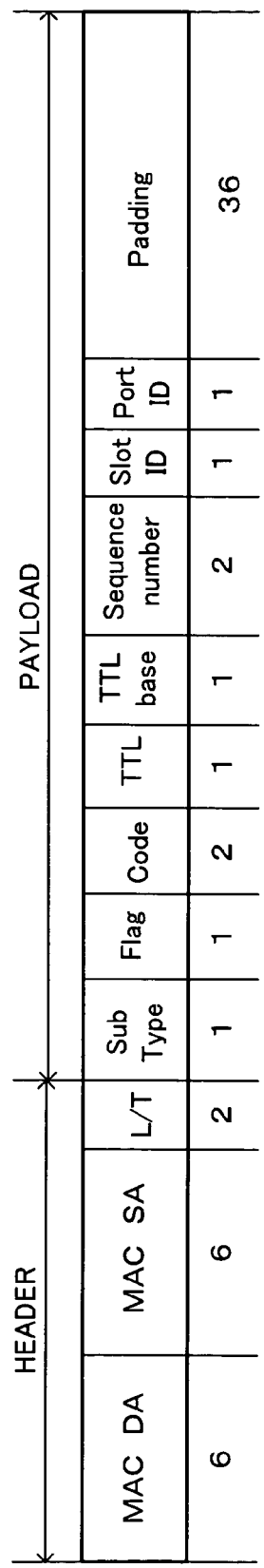
FIG. 6 shows the format of a fault monitoring control packet.

The format of the fault monitoring control packet will be now described with reference to FIG. 6, wherein the numbers indicate respective values in bytes. Individual fields of the packet will be explained below.

"MAC DA" (6 bytes) is a destination MAC address and an address specified by a command is set therein. A default value is "01-00-0E-00-00-01". "MAC SA" (6 bytes) is a source MAC address, and the MAC address of the local device is set therein.

"L/T" (2 bytes) indicates Ether-Type of the fault monitoring control packet and a command-specified value is set therein. For "Sub Type" (1 byte), a fixed value "0×20" is set ("0×20" serves as an identification number indicating that this packet is a fault monitoring control packet).

For "Flags" (1 byte), a fixed value "0" is set, and for "Code" (2 bytes), "02-00" is set, thereby indicating that this packet is a control packet for the LCC function. "TTL (Time to Live)" (1 byte) is a reserve field (fixed at "255"), and "TTL base" (1 byte) also is a reserve field (fixed at "255").

"Sequence number" (2 bytes) is fixed at "0". "Slot-ID" (1 byte) is a slot identifier of the port from which the packet is transmitted, and "Port-ID" (1 byte) is a port identifier of the port from which the packet is transmitted. In "Padding" (36 bytes), "0" is set for all bytes.

Figure 7:
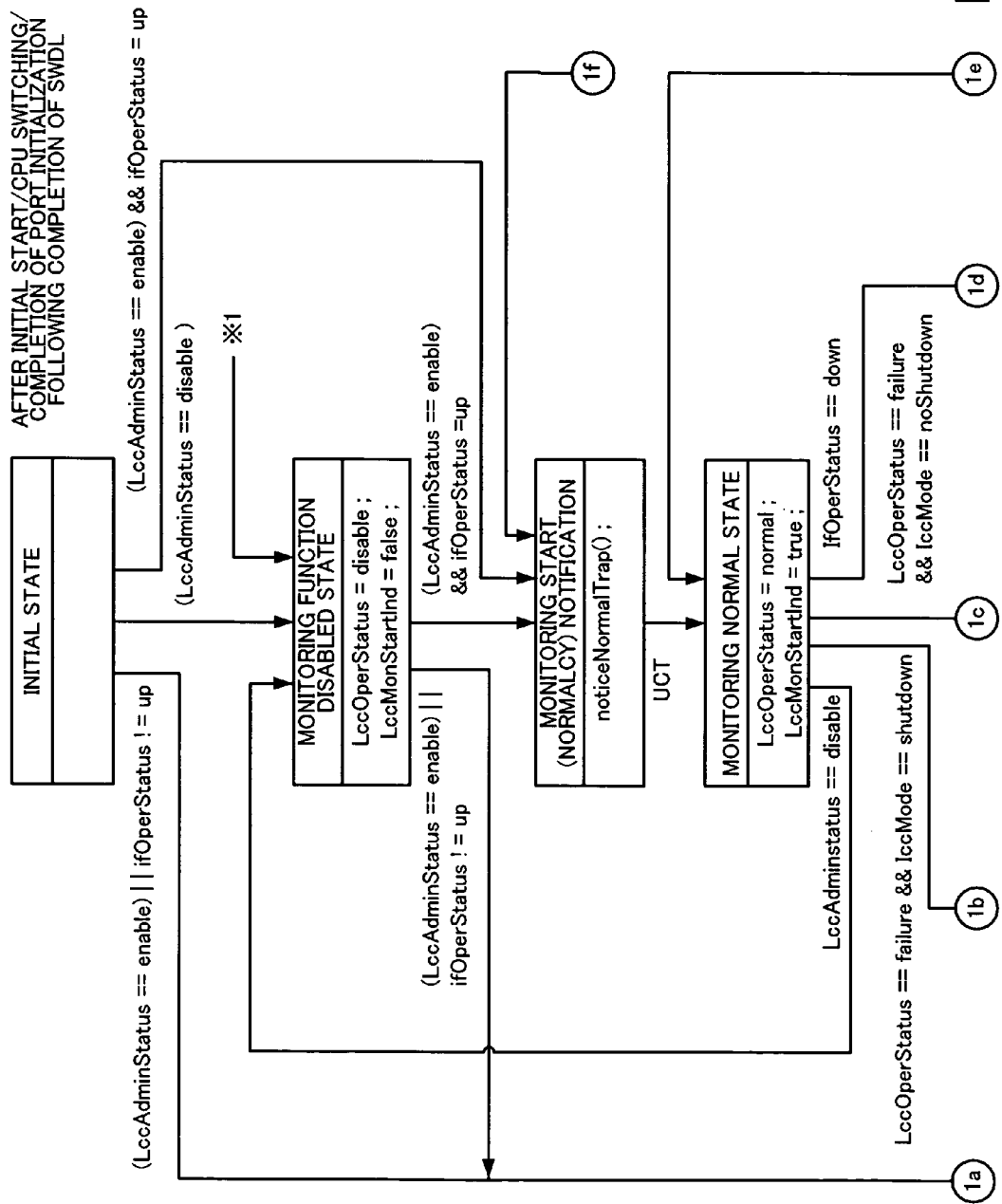
FIG. 7 illustrates state transitions of a port status state machine.
Figure 8:
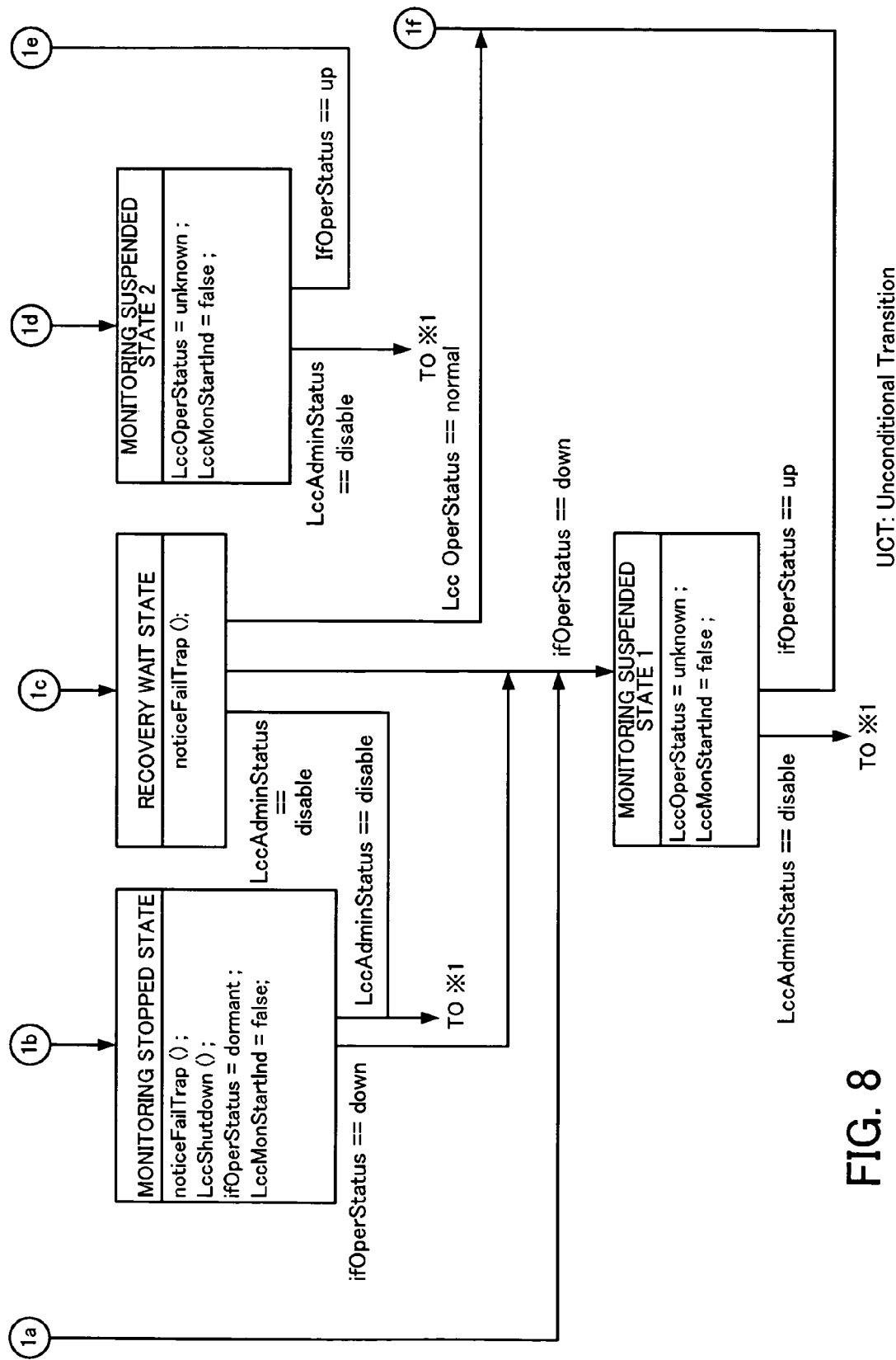
FIG. 8 illustrates state transitions of the port status state machine.

The port status state machines and fault monitoring state machines of the communication device 30 will be now described. FIGS. 7 and 8 illustrate state transitions of the port status state machines #1 to #n. The following explains the definitions of variables.

LccAdminStatus: Indicates a state of the port as to the LCC function setting, and has a "disable" state and an "enable" state.

ifOperStatus: Indicates an operational link state of the port and has three states "up", "down" and "dormant" (newly added). Transition to the "dormant" state takes place when "shutdown" is executed by the function of the present invention, and transition to the other states takes place only when an ordinary "shutdown" command is input.

LccOperStatus: Indicates a state of the port as to the function of the present invention and has a monitoring function disabled state, a monitoring normal state, a failure state, and a monitoring suspended state. The monitoring function disabled state ("disable") is a state in which the function is not enabled or the link is not up though the function is enabled. The monitoring normal state ("normal") is a state in which the monitoring is performed by the function of the invention, and thus, a normal state. The failure state ("failure") is a state in which a fault is being detected by the function of the invention, and in this case, "ifoperStatus" of the port indicates either a "dormant" state or an "up" state depending on the operation mode. The monitoring suspended state ("unknown") is a state in which the monitoring is suspended because of detection of "LINK DOWN" ("if OperStatus"="down") in the monitoring normal state.

LccMonStartInd: An operation indicator for the fault monitoring state machine. Change to the value "true" of this operation indicator causes the fault monitoring state machine to start monitoring, and change to the value "false" causes the fault monitoring state machine to stop the monitoring.

LccMode: Signifies an operation mode (specified by a command) to be assumed when a fault is detected by the function of the invention. The operation mode includes a "shutdown" mode (in which "shutdown" is executed upon detection of a fault) and a "noShutdown" mode (in which "shutdown" is not executed when a fault is detected).

The following are the definitions of functions of the port status state machines #1 to #n.

noticeNormalTrap( ): TRAP indicating start of the fault monitoring is transmitted, with the detected "portid" included as additional information.

noticeFailTrap( ): TRAP indicating that a fault has been detected by the function of the invention is transmitted, with the detected "portid" and fault type (Rx/Tx/RxTx) included as additional information.

LccShutdown( ): The "shutdown" according to the LCC function is executed.

Figure 9:
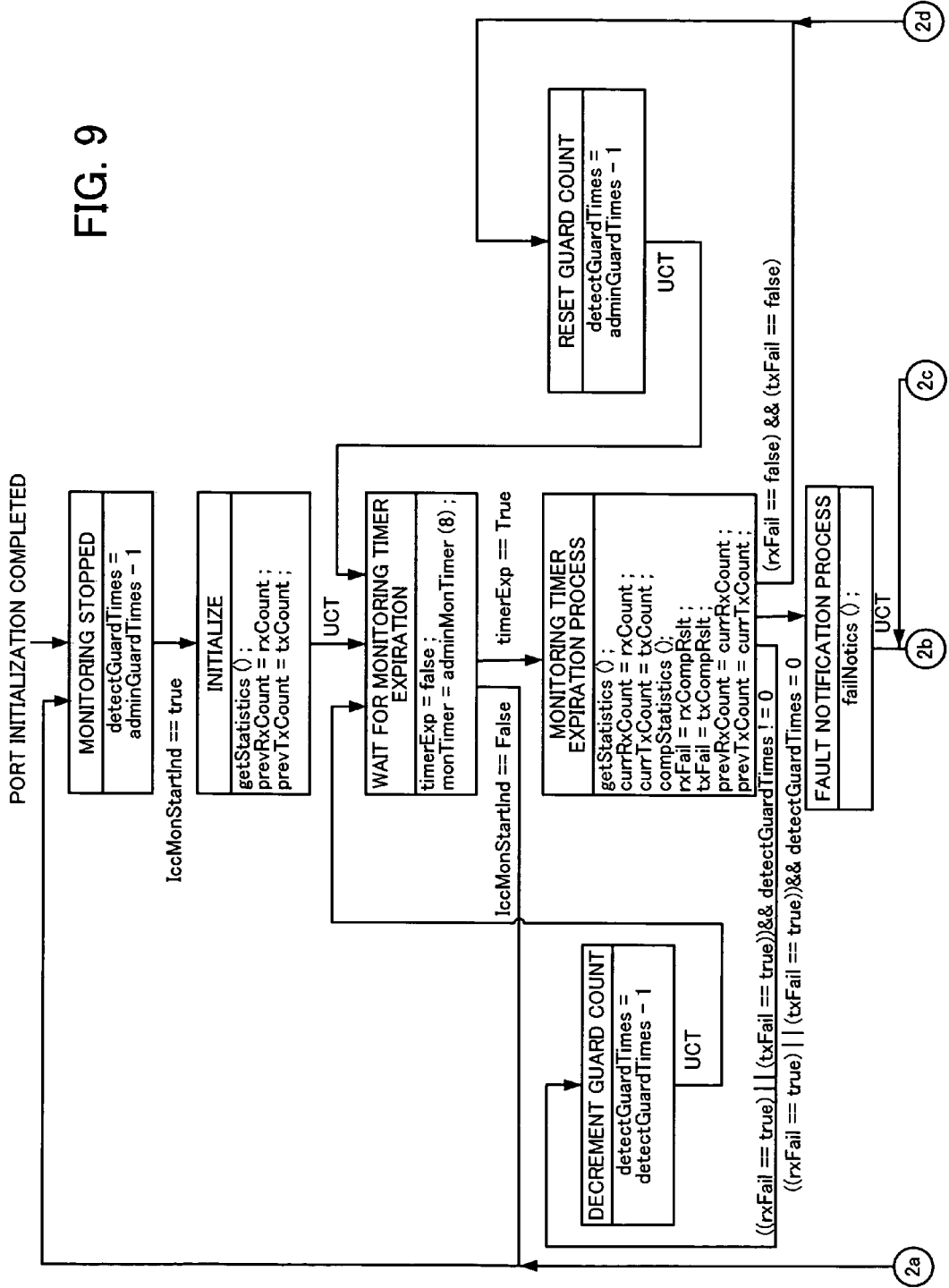
FIG. 9 illustrates state transitions of a fault monitoring state machine.
Figure 10:
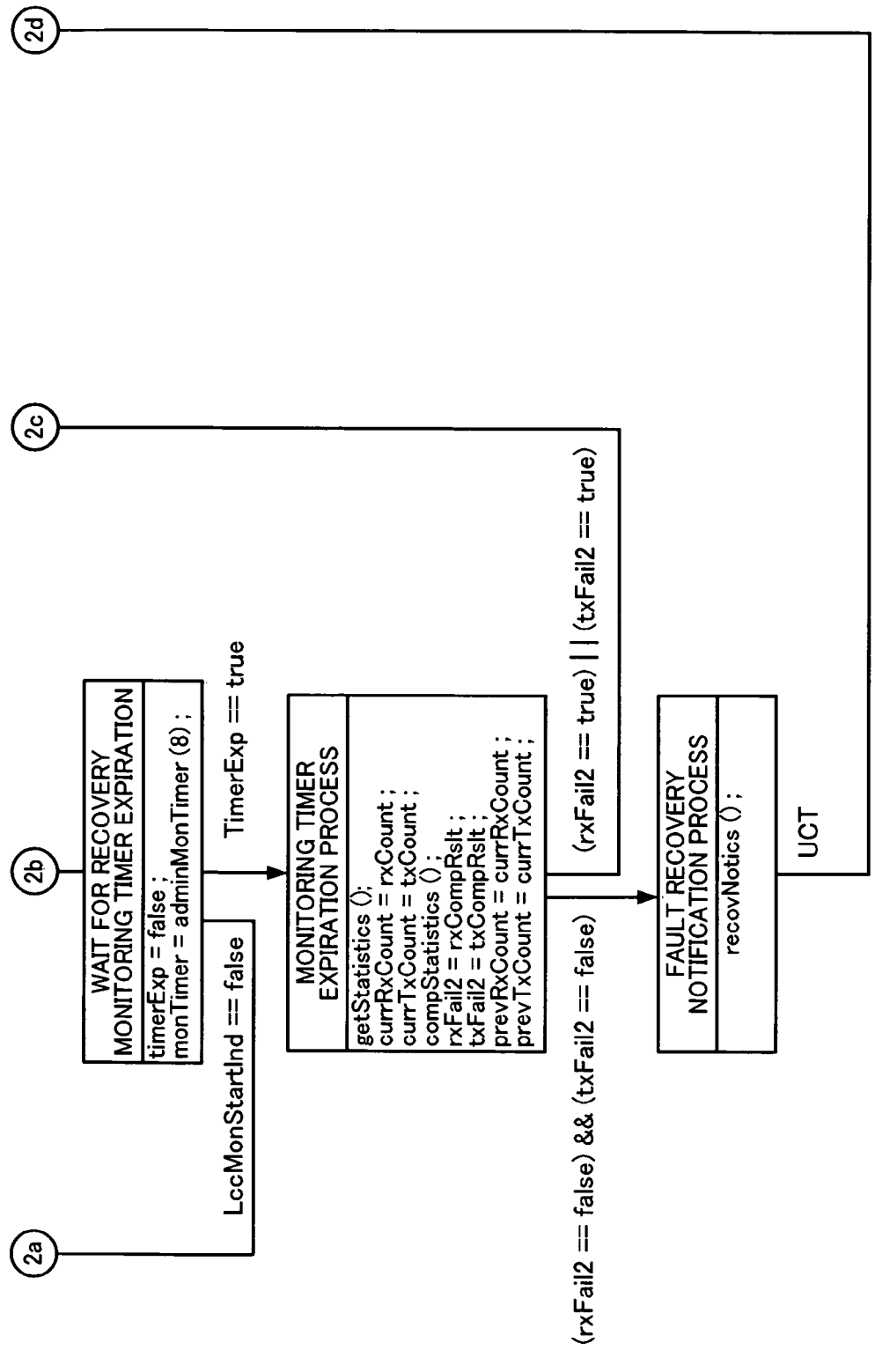
FIG. 10 illustrates state transitions of the fault monitoring state machine.
Figure 11:
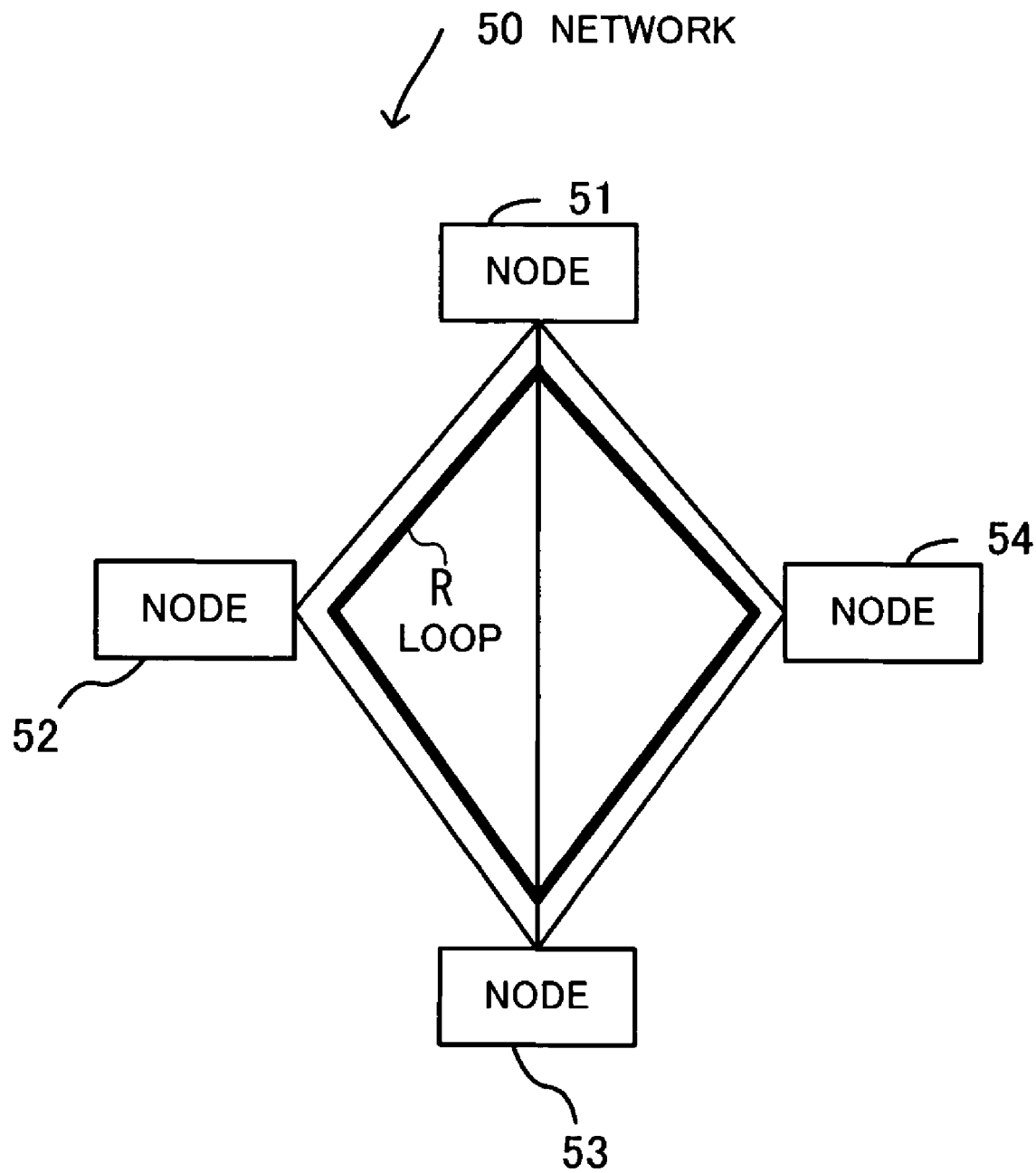
FIG. 11 illustrates a network fault caused by looping.
Figure 12:
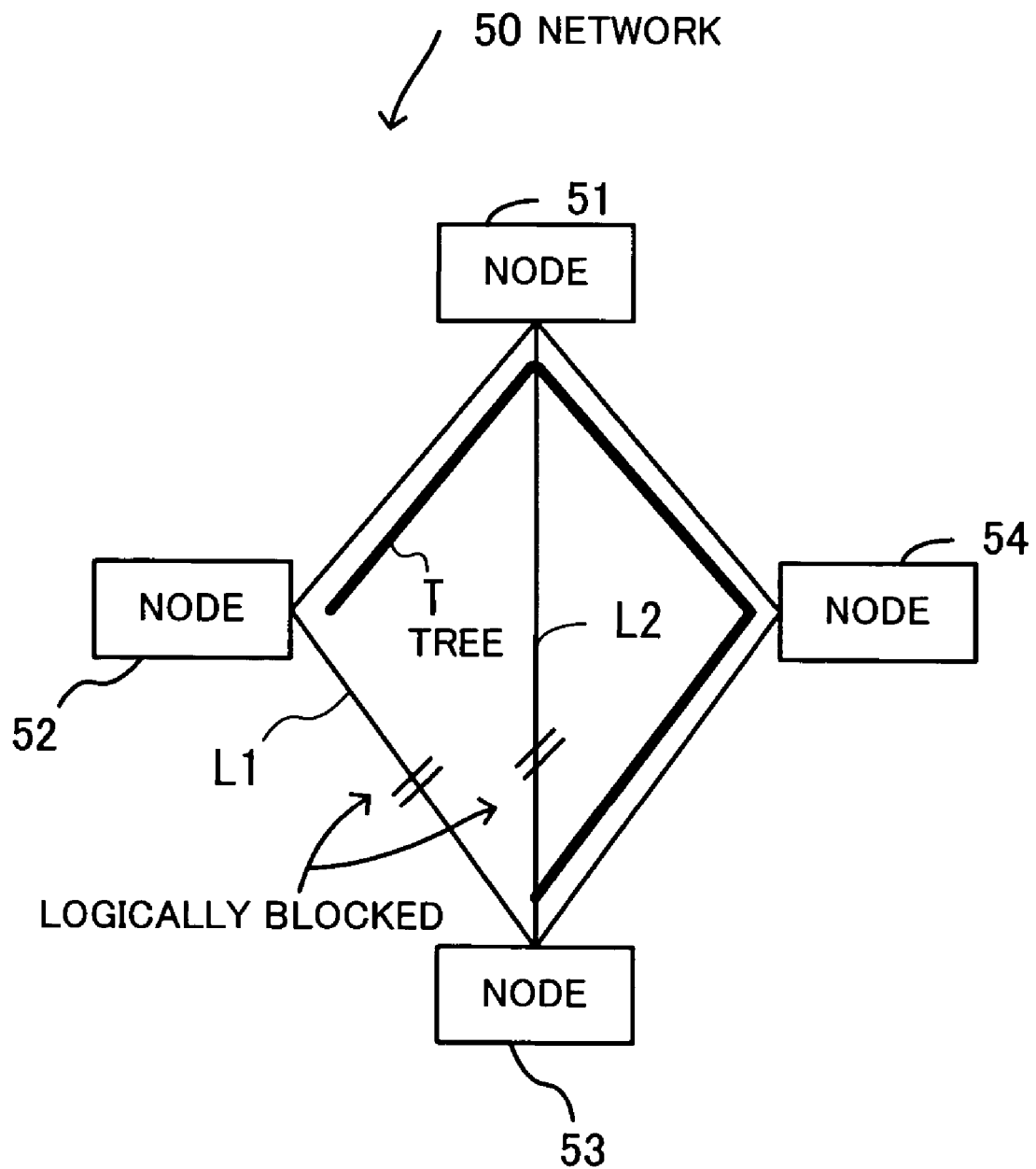
FIG. 12 also illustrates a network fault caused by looping.
Figure 13:
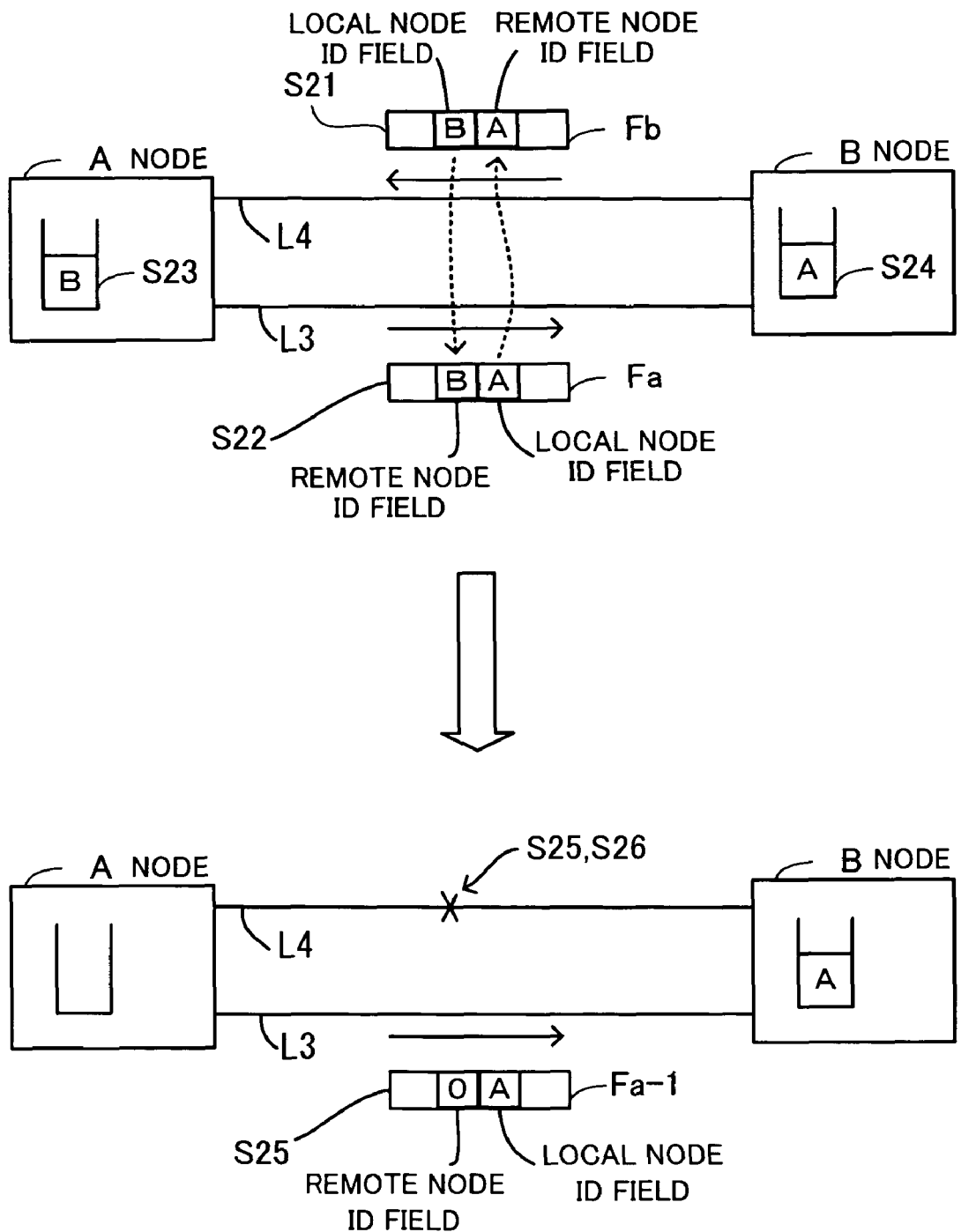
FIG. 13 illustrates a procedure for network fault detection.

FIGS. 9 and 10 illustrate state transitions of the fault monitoring state machines #1 to #n. The following explains the definitions of variables.

prevRxCount: Indicates the contents of a receive packet counter showing the receive packet count acquired in the immediately preceding cycle.

prevTxCount: Indicates the contents of a transmit packet counter showing the transmit packet count acquired in the immediately preceding cycle.

currRxCount: Indicates the contents of a receive packet counter showing the receive packet count acquired in the present cycle.

currTxCount: Indicates the contents of a transmit packet counter showing the transmit packet count acquired in the present cycle.

rxCount: Indicates the contents of a receive packet counter showing the receive packet count acquired using a function "getStatistics".

txCount: Indicates the contents of a transmit packet counter showing the transmit packet count acquired using the function "getStatistics".

rxFail: A variable (used for the fault monitoring) indicating whether the monitoring by means of the receive packet counters is normal or not.

txFail: A variable (used for the fault monitoring) indicating whether the monitoring by means of the transmit packet counters is normal or not.

rxFail2: A variable (used for the recovery monitoring) indicating whether the monitoring by means of the receive packet counters is normal or not.

txFail2: A variable (used for the recovery monitoring) indicating whether the monitoring by means of the transmit packet counters is normal or not.

timerExp: A variable which is set to "true" by a timer state machine when a registered timer expires.

monTimer: A timer variable registered in the timer state machine. When this variable has a value other than "0", the timer state machine decrements the variable by "1" at intervals of 1 second, and when the variable reaches "0", the timer state machine sets "timerExp" to "true".

adminMonTimer: A variable set as a monitoring timer (in R2.3, fixed at "8").

rxCompRslt: A variable (receive packet counter) in which is stored the result of execution of a function "compStatistics".

txCompRslt: A variable (transmit packet counter) in which is stored the result of execution of the function "compStatistics".

detectGuardTimes: A variable used to determine whether or not a fault is continuously detected a number of times corresponding to the guard count.

adminGuardTimes: A guard count specified by CLI.

The following are the definitions of functions of the fault monitoring state machines #1 to #n.

getstatistics( ): The receive and transmit packet counters of statistics information are looked up to compare the corresponding two counts with each other, and the results are stored in "rxCount" and "txCount", respectively.

compStatistics( ): Comparison is made between "prevRxCount" and "currRxCount" and between "prevTxCount" and "currTxCount", and the results are stored in "rxCompRslt" and "txCompRslt", respectively (if the two coincide, "true" is set, and if not, "false" is set).

failNotics( ) The value "failure" is set in "LccOperStatus", thereby notifying the port status state machine that a fault has been detected ("rxFail"/"txFail" is looked up as additional information by the port status state machine).

recovNotics( ): The value "normal" is set in "LccOperStatus", thereby notifying the port status state machine that recovery from fault has been detected.

Control parameters (for transmission) include destination MAC address, Ether Type, and control packet transmission interval (fixed value: 3 seconds). Control parameters (for monitoring) include monitoring timer (fixed timer value: 8 seconds; if either of the transmit and receive packet counts fails to change during this time period, fault is judged to have occurred), operation mode, and guard count.

Notification (TRAP) notifies the maintenance technician that a fault has been detected. At this time, the port with respect to which the fault has been detected as well as the fault type (Rx/Tx/RxTx) are notified as additional information. TRAP also notifies the maintenance technician of recovery from fault, and in this case, the recovered port is notified as additional information.

Notification (CLI) permits the maintenance technician to look up the settings related with the LCC (Link Connectivity Check) function or the state of the monitored port (port state: "normal", "failure", "unknown" or "disable") by using a command.

A filtering condition is set such that the received control packet is discarded after the fault monitoring statistics information is collected.

As described above, the fault detection device 10 is effective in the detection of silent faults of links of carrier networks configured in multi-vendor environments and makes it possible to enhance the fault tolerance of such networks. In particular, despite its unique functionality, the fault detection device 10 does not require any modification of different vendors' devices, and accordingly, it is easy for carriers to introduce the fault detection device into multi-vendor environments.

The fault detection device of the present invention is constructed so as to keep count of the fault monitoring control packet transmitted to an associated device with which the fault detection device need not interoperate to detect faults according to an identical protocol, to keep count of the control packet received from the associated device, and to judge that a fault has occurred, if at least one of the transmit and receive packet counts fails to change during the fixed period of time. This enables the local device to detect network faults by itself with high accuracy in multi-vendor environments, without the need to interoperate with the associated device according to an identical protocol.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A fault detection device for detecting faults on a network, comprising:
   a monitoring control packet transmitter, arranged at a higher layer above a link layer in the fault detection device, to generate a fault monitoring control packet configured to carry no control content in a payload thereof and to be discarded at a receiving end device other than the fault detection device and transmit the generated fault monitoring control packet to an associated device with which the fault detection device need not interoperate to detect faults according to a protocol;
   a transmit packet counter, arranged at a physical layer or the link layer in the fault detection device to monitor outputs of the higher layer above the link layer, to detect transmit packets carrying no control content in a payload thereof and to be discarded at a receiving end device other than the fault detection device, and keep count of the detected transmit packets;
   a receive packet counter to receive control packets transmitted from the associated device, and keep count of the received control packets; and
   a fault detector to monitor the count of transmitted packets and the count of received packets and, if at least one of the counts remains unchanged for a fixed period of time, judge that a fault has occurred and send a fault notification.

2. The fault detection device according to claim 1, wherein the fault monitoring control packet is independent of user traffic and is constantly transmitted from the monitoring control packet transmitter at fixed intervals so that erroneous detection of faults does not occur even while there is no user traffic.

3. The fault detection device according to claim 1, wherein the fault detection device and the associated device are connected by a link aggregation including multiple links which are treated as a single virtual link,
   the monitoring control packet transmitter transmits the fault monitoring control packet via each of the multiple links, the transmit packet counter keeps count of the transmitted fault monitoring control packets with respect to each of the multiple links, the receive packet counter receives the control packet transmitted from the associated device via each of the multiple links and keeps count of the received control packets with respect to each of the multiple links, and the fault detector detects faults with respect to each of the multiple links.

4. A fault detection method executed by a local device for detecting faults on a network, the method comprising:
   generating a fault monitoring control packet at a higher layer above a link layer, the fault monitoring control packet being configured to carry no control content in a payload thereof and to be discarded at a receiving end device other than the local device;
   transmitting the generated fault monitoring control packet from the local device to an associated device with which the local device need not interoperate to detect faults according to a protocol;
   detecting, by using a transmit packet counter arranged at a physical layer or the link layer to monitor outputs of the higher layer above the link layer, transmit packets carrying no control content in a payload thereof and to be discarded at a receiving end device other than the local device, and keeping count of the detected transmit packets;

receiving a control packet transmitted from the associated device;

keeping count of the received control packets by using a receive packet counter;

monitoring the count of transmitted packets and the count of received packets;

judging that a fault has occurred if at least one of the counts remains unchanged for a period of time; and sending a fault notification if it is judged that a fault has occurred.

5. The fault detection method according to claim 4, wherein the fault monitoring control packet is independent of user traffic and is constantly transmitted at fixed intervals so that erroneous detection of faults does not occur even while there is no user traffic.

6. The fault detection method according to claim 4, wherein the local device and the associated device are connected by a link aggregation including multiple links which are treated as a single virtual link, the fault monitoring control packet is transmitted via each of the multiple links, the transmit packet counter keeps count of the transmitted fault monitoring control packets with respect to each of the multiple links, and the receive packet counter receives the control packet transmitted from the associated device via each of the multiple links and keeps count of the received control packets with respect to each of the multiple links, to thereby detect faults with respect to each of the multiple links.

7. The fault detection method according to claim 4, wherein the local device detects faults without making the associated device aware of fault monitoring.

8. The fault detection device according to claim 1, wherein the receive packet counter is arranged at the higher layer above the link layer in the fault detection device.

9. The fault detection device according to claim 4, wherein the receive packet counter is arranged at the higher layer above the link layer in the local device.

* * * * *